United States Patent [19]

McCullough

[11] Patent Number: 4,463,591
[45] Date of Patent: Aug. 7, 1984

[54] METHOD OF FABRICATING SCROLL MEMBERS BY COINING AND TOOLS THEREFOR

[75] Inventor: John E. McCullough, Carlisle, Mass.

[73] Assignee: Arthur D. Little, Inc., Cambridge, Mass.

[21] Appl. No.: 488,469

[22] Filed: Apr. 25, 1983

Related U.S. Application Data

[62] Division of Ser. No. 239,564, Mar. 2, 1981, Pat. No. 4,403,494.

[51] Int. Cl.³ ............ B21D 22/00; B21D 31/00; B21D 17/02
[52] U.S. Cl. ............................ 72/360; 72/375; 72/376; 72/414
[58] Field of Search ............ 29/156.4 R, 156.8 R, 29/509, 512, 522, 527.5, 527.7; 72/375, 376, 377, 360, 412, 414, 474, 475; 418/55, 57

[56] References Cited

U.S. PATENT DOCUMENTS

| | | | |
|---|---|---|---|
| 1,659,776 | 2/1928 | Langford | 72/376 |
| 3,314,277 | 4/1967 | Hopkins et al. | 72/375 |
| 3,986,799 | 10/1976 | McCullough | 418/55 |
| 4,199,308 | 4/1980 | McCullough | 418/55 |

Primary Examiner—Howard N. Goldberg
Assistant Examiner—Steven E. Nichols
Attorney, Agent, or Firm—Richard J. Hammond

[57] ABSTRACT

Method for forming scroll members comprising an end plate having an involute wrap rigidly affixed thereto. The end plate and involute wrap are precision formed, e.g., by casting, either as an integral element or as two separate elements and then the scroll member is coined to the desired dimensional accuracy and finish. If a separate end plate and an involute wrap are provided for coining, then they are rigidly joined during coining, an embodiment which permits the use of two different materials and/or the attainment of two different surface characteristics for the involute wrap and the end plate.

8 Claims, 13 Drawing Figures

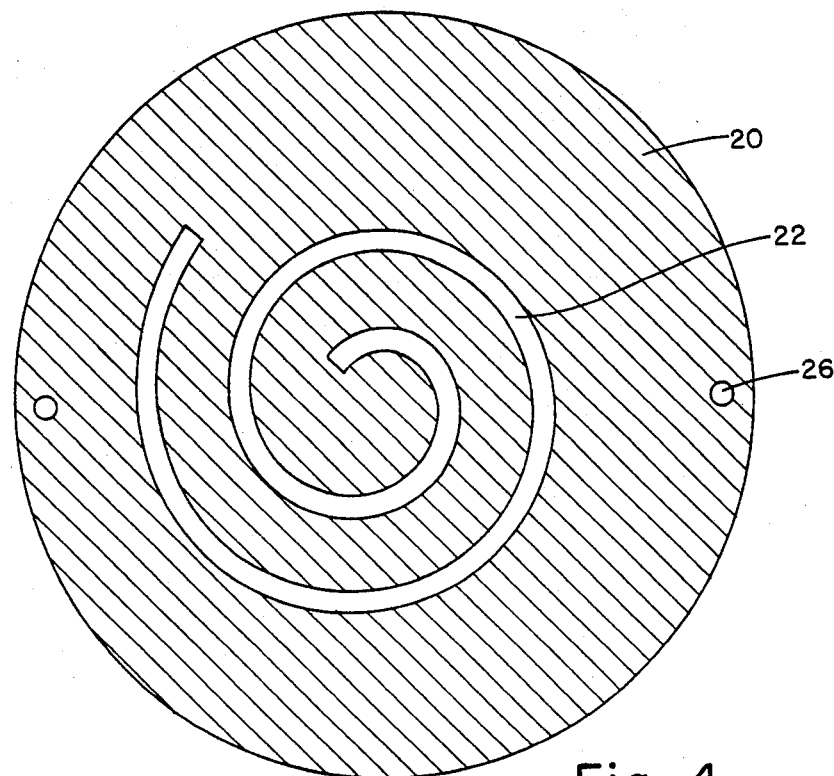
Fig. 4
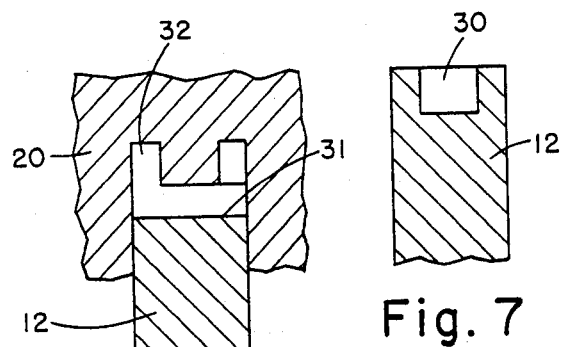
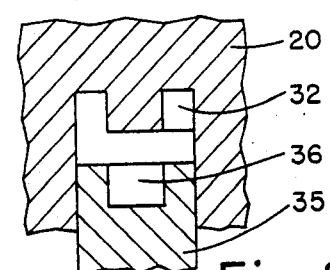
Fig. 7
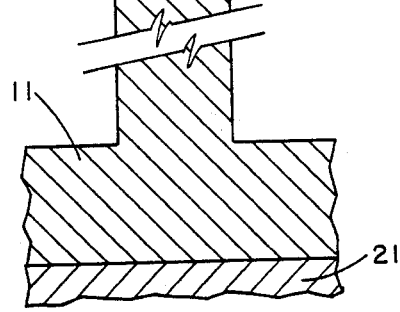
Fig. 6
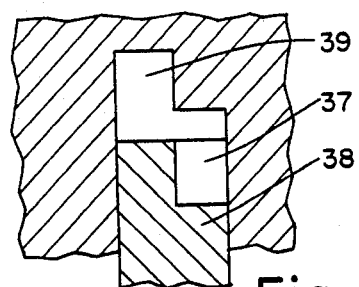
Fig. 8
Fig. 9

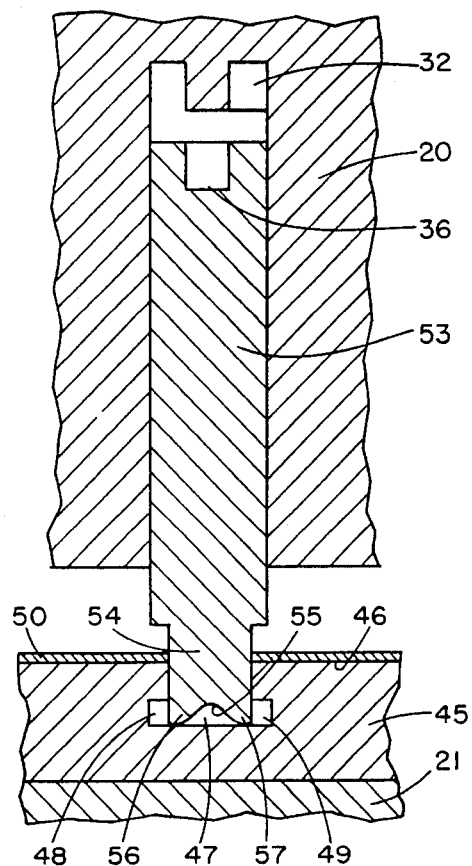
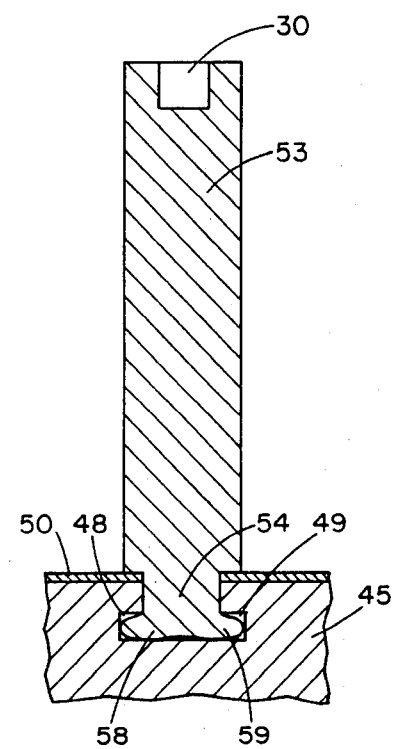
Fig. 10
Fig. 11
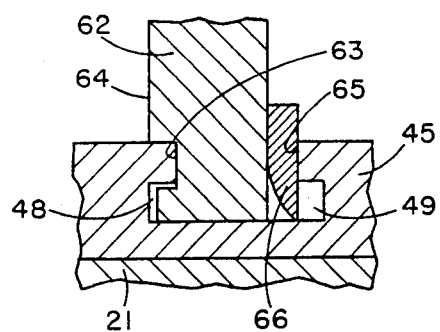
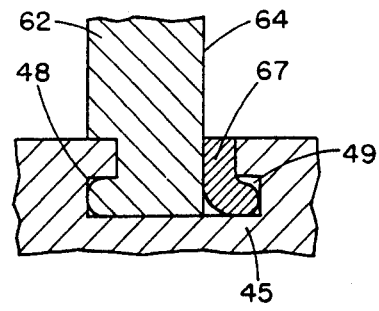
Fig. 12
Fig. 13

METHOD OF FABRICATING SCROLL MEMBERS BY COINING AND TOOLS THEREFOR

This application is a division, of application Ser. No. 239,564, filed Mar. 2, 1981, now U.S. Pat. No. 4,403,494.

This invention relates to scroll-type apparatus and more particularly to the construction of the scroll members used therein.

There is known in the art a class of devices generally referred to as "scroll" pumps, compressors and expanders wherein two interfitting spiroidal or involute spiral elements of like pitch are mounted on separate end plates. These spiral elements are angularly and radially offset to contact one another along at least one pair of line contacts such as between spiral curved surfaces. A pair of line contacts will lie approximately upon one radius drawn outwardly from the central region of the scrolls. The fluid volume so formed therefore extends all the way around the central region of the scrolls and comprises one or more fluid pockets, the angular position of which varies with relative orbiting of the spiral centers. All of these pockets maintain the same relative angular position; and as the contact lines shift along the scroll surfaces, the pockets experience a change in volume. The resulting zones of lowest and highest pressures are connected to fluid ports.

Important recent developments in scroll apparatus technology have essentially solved the problems connected with the attainment of effective sealing of the fluid pockets; and a number of novel driving means, coupling means, thrust bearing means, porting means, etc., suitable for scroll apparatus, have been disclosed. (See for example U.S. Pat. Nos. 3,874,827, 3,884,599, 3,924,977, 3,986,799, 3,994,633, 3,994,636, 4,065,279, 4,082,484, 4,121,438, 4,129,409, 4,160,629, 4,192,152 and 4,199,308.)

In constructing the scroll members, each of which comprises an end plate with the involute spiral wrap element attached thereto, it has previously been the practice to form these members from a single piece of metal by machining out the involute spiral wraps. Although this is, of course, within the capabilities of present milling techniques it consumes a great deal of time and energy and produces large quantities of waste metal. Thus relying solely on milling techniques for scroll member fabrication makes it unduly expensive to form the scroll members for scroll-type apparatus, a fact which for many applications does not permit scroll-type apparatus to compete in price with other types of compressors or expansion engines. Such added cost thus outweighs the operational advantages inherent in scroll-type machinery.

Radial sealing of the fluid pockets, i.e., sealing across the tip surface of the involute wraps to prevent leakage from a pocket of higher pressure to an adjacent pocket of lower pressure is prefeably now controlled through the use of axial compliance/sealing means such as detailed in U.S. Pat. Nos. 3,994,636 and 4,199,308 and in United States application Ser. No. 233,915 filed Feb. 12, 1981. The use of such sealing means eliminates the need for the lapping of the wrap and end plate contacting surfaces. However, effective sealing requires that along its entire length the involute wrap is joined at its base to the end plate to define a right angle or other accurately formed configuration to permit the required contact with the opposing end of the complementary scroll member when assembled in an operational scroll apparatus. Effective sealing also requires the accurate dimensioning and finishing of the wrap flanks and the end plate surface.

A suitable mass production technique for scroll components, i.e., scroll members, should involve minimum and preferably no machining; and it should provide components which meet the stringent requirements for dimensional accuracy and finishing associated with efficient scroll operation. There are two basic constructional alternatives for fabricating scroll members, namely, forming them from an integrally cast involute and end plate or forming the involute and end plate separately and joining them into a finished scroll member.

An improved method of rigidly joining an involute wrap to an end plate to form a scroll member is described and claimed in my copending patent application Ser. No. 239,563 filed concurrently herewith. In brief, the joining method of that application comprises forming in the surface of an end plate an involutely configured channel having defined along the length of one of its side walls a reentrant groove; providing an involute wrap sized and configured to seat in the channel and having a surface configured to at least partially engage the reentrant groove; seating the involute wrap into the channel to define a locking space between the flank of the wrap and the other side wall of the channel; and locking in the wrap into fixed engagement with the groove.

Precision die casting of one-piece scroll members followed by one or another finishing techniques also eliminates the disadvantages of having to rely solely on milling of the involute wrap to attain the required dimensions and finish. One such method of fabrication, described in my copending application Ser. No. 239,414, filed concurrently herewith, comprises the axial broaching of the involute walls and the machining of the end plate surface. Broaching, which is particularly suitable for finishing scroll members formed from less ductile materials, e.g., cast iron, is adaptable to relatively highspeed fabrication. However, it demands the use of somewhat complicated tooling and requires an integral scroll member element, whether it is cast as an integral unit or formed by rigidly affixing an involute to an end plate.

On the other hand, coining or closed-die forming of a precision cast scroll component can be applied equally well to an integrally cast scroll member or to one comprising a separate involute wrap and an end plate. As will be shown, the latter alternative offers the possibility of forming the involute wrap and the end plate of two different metals. As used hereinafter the term "coining" refers to closed-die forming whether it is cold forming (ambient temperature), or warm forming (below that temperature at which any appreciable recrystallization of the metal is effected).

It is therefore a primary object of this invention to provide an improved method for forming scroll members. It is another object to provide a method of the character described which is particularly suitable for mass production, which provides scroll members well within the dimensional accuracy and finish characteristics required of such machine elements and which is equally applicable to both of the basic constructional alternatives for fabricating scroll members. A further object of this invention is to provide a method for scroll member fabrication which permits using different metals and obtaining optimum but different finishing characteristics for the flanks of the involute wrap and the end plate. Yet a further object is to provide a method of the character described which makes it possible to form scroll members having a wide range of structural variations such as keyways for coupling means, particular bearing surfaces, involute tip channels for sealing means and the like.

It is another primary object of this invention to provide tooling for coining scroll members from precision cast elements. Another object is provide tooling of the character described which makes it possible to mass produce scroll members, which may have a wide range of structural variations, well within the dimensional accuracy and finish characteristics required. Still a further object is to provide such tooling which can be used to fabricate a scroll member initially precision cast as an integral unit or formed as a separate involute wrap and end plate.

Other objects of the invention will in part be obvious and will in part be apparent hereinafter.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

According to one aspect of this invention there is provided a method of fabricating a scroll member, comprising the steps of providing a preformed scroll member comprising an end plate and an involute wrap which have attained at least about 95 percent of the dimensional accuracy and finish required for the flank surfaces of the wrap and the contacting surface of the end plate; and coining the preformed scroll member to the required dimensional accuracy and finish.

The scroll member provided for coining may be an integral element, or the involute wrap and end plate may be separate elements in which case the coining step is used to rigidly affix the wrap to the end plate. The latter embodiment permits the use of two different materials and/or the attainment of two different surface characteristics for these two elements.

According to another aspect of this invention there is provided a closed die for coining a scroll member formed of an end plate and an involute wrap rigidly affixed thereto, comprising in combination an involute die defining therein an involute cavity corresponding to the desired configuration of the involute wrap and having a first contacting surface; and an end plate die defining therein a cavity corresponding to the desired configuration of the end plate and having a second contacting surface which forms with the first surface a closed die when an axial force is applied thereto.

For a fuller understanding of the nature and objects of the invention, reference should be had to the following detailed description taken in connection with the accompanying drawings in which FIG. 1 is a top planar view of a typical scroll member;

FIG. 4 is a cross section of the involute die of FIG. 3 taken through plane 4—4 of FIG. 3;

FIG. 6 is a partial cross section of another embodiment of the involute die for forming in the tip surface of the involute a three-sided channel for a tip sealing means and of the use of a precision cast involute having a flat tip surface prior to coining;

FIG. 7 is a partial cross section of the involute formed by using the embodiment of FIG. 6;

FIG. 8 is a partial cross section showing the use of a precision cast involute having a preformed channel in the die embodiment of FIG. 6;

FIG. 9 illustrates in cross section the use of yet another embodiment of the involute die and precast involute wrap to form a two-sided channel for a tip sealing means;

FIGS. 10 and 11 illustrate in partial cross section one embodiment of the use of coining in accordance with this invention to form a scroll member from a separate involute wrap and end plate; and FIGS. 12 and 13 illustrate in partial cross section another embodiment of the use of coining starting with a separate involute wrap and end plate.

Figure 1:
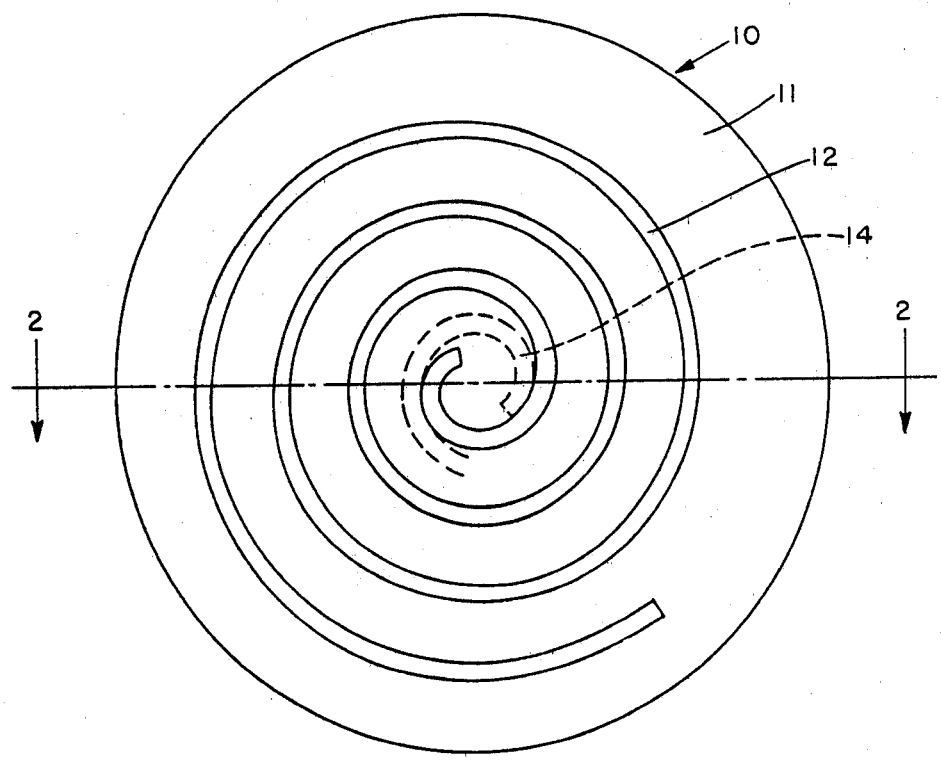
Figure 2:
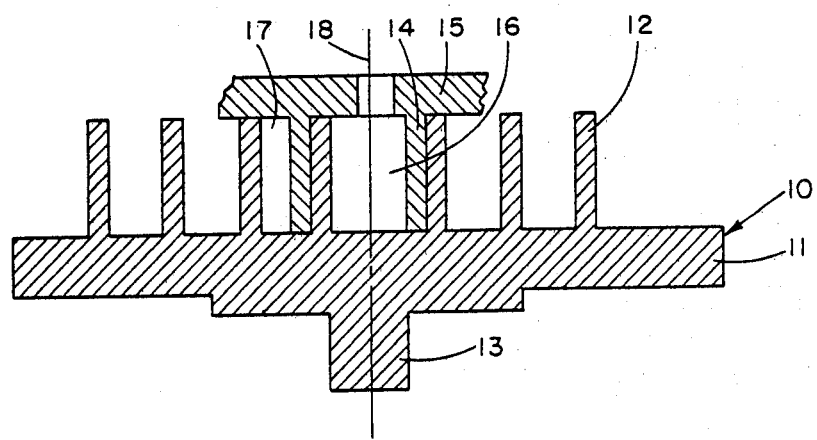
FIG. 2 is a cross section of the scroll member of FIG. 1, through plane 2—2 of FIG. 1, along with a fragmentary cross section of a complementary mating scroll member.

FIGS. 1 and 2 illustrate the basic design of a typical scroll member suitable for use in any of the scroll apparatus described in the previously listed United States Patents. The basic construction of any scroll member 10 comprises an end plate 11 and an involute wrap 12 affixed thereto. Th wrap is hereinafter for convenience referred to as being "involute", i.e., configured as an involute of a circle. However, it is to be understood that the wraps may have, for example, the configuration of an arc of a circle, or any other suitable shape. The scroll member 10 of FIGS. 1 and 2 is suitable as the orbiting member of a scroll apparatus and is therefore shown to have a stub shaft 13. It will be appreciated that requirements for such other features as keyways, ports, peripheral walls, special bearing surfaces and the like may vary from one scroll apparatus to another and that the various configurations and/or surface modifications required to provide such features may be achieved by the fabrication method and the tools hereinafter described in detail.

As detailed in the United States Patents previously listed, a scroll apparatus is made up of complementary scroll members having facing end plates with angularly and radially offset involute wrap of like pitch. The orbiting of one of these scroll members angularly and radially apart from the other defines fluid pockets which in the case of a compressor or expander decrease in pressure radially outward from the machine axis. Thus as illustrated in partial cross section in FIG. 2, the contacting of wrap flanks 14 affixed to the complementary end plate 15 of a stationary scroll member defines fluid pockets 16 and 17 in which $P_{16} > P_{17}$. As will be shown below, the existence of this pressure differential across the involute wrap may have a bearing on the fabrication of scroll members in accordance with some embodiments of this invention.

The dimensional accuracy and precision of finishing which must be attained in the manufacture of highly efficient scroll members may be illustrated using as exemplary one having involute wraps which are 0.187 inch (0.475 cms) thick and 1.25 inches (3.175 cms) high. The distances from the centerline 18 to the inner and outer wrap flank surface should be within ±0.001 inch (±0.025 mm).

According to the method of this invention the scroll member, either as a single element or as a separate involute wrap and end plate, is precision formed as closely to the desired final dimensions and finish as possible. Wellknown die casting or lost wax casting techniques may be used. It is essential in using the somewhat less ductile materials (e.g., steels and suitable cast irons) to achieve by precision casting at least 95% of the final finish and dimensional accuracy sought. That is, the coining step is restricted to making dimensional changes which are less than 5% of the precision cast element. In using the more ductile metals, e.g., a ductile aluminum, it is possible to reshape the metal to conform to such desired configuration as involute channels in the involute tip and/or narrow keyways in the bottom of the end plate for keys on a coupling means. However, even in such a case, the involute and end plate must be cast with as much precision as it is possible to attain.

The precision casting of the scroll element clearly distinguishes the method of this invention over what may be termed impact extrusion as disclosed, for example, in Japanese Ser. No. 53-67,762, filed June 7, 1978 (published as Kokai No. 54-159,712 on Dec. 17, 1979) or Japanese Ser. No. 53-128,358, filed Oct. 20, 1978 (published as Kokai 55-57686 on Apr. 28, 1980). In the first of these prior art methods a blank in the form of a bottom, larger-diameter disk having integral therewith an upper, solid, smaller-diameter disk is forced into a female die defining an involute wrap configuration. The small diameter disk is formed of just that volume of metal required to form the wrap. In the second of these prior art methods, an involute channel is cold forged into the end plate surface and a separate involute set in it.

Figure 3:
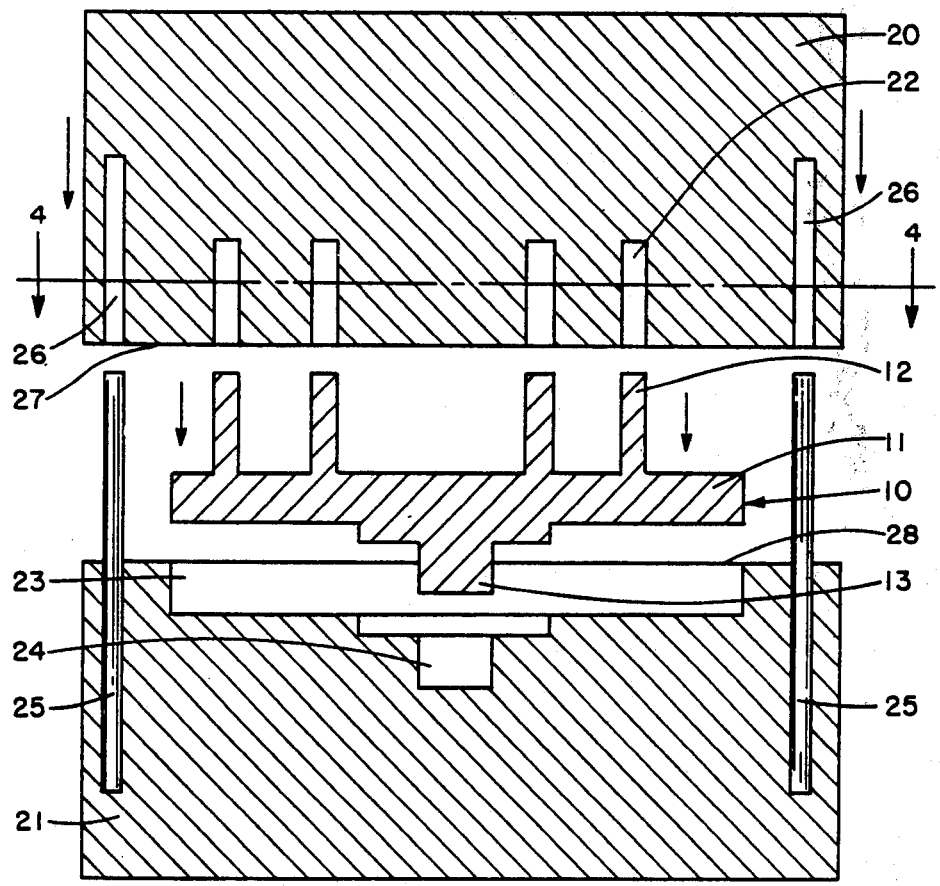
FIG. 3 illustrates in cross section one embodiment of the dies of this invention and their use in coining a scroll member in accordance with this invention.
Figure 5:
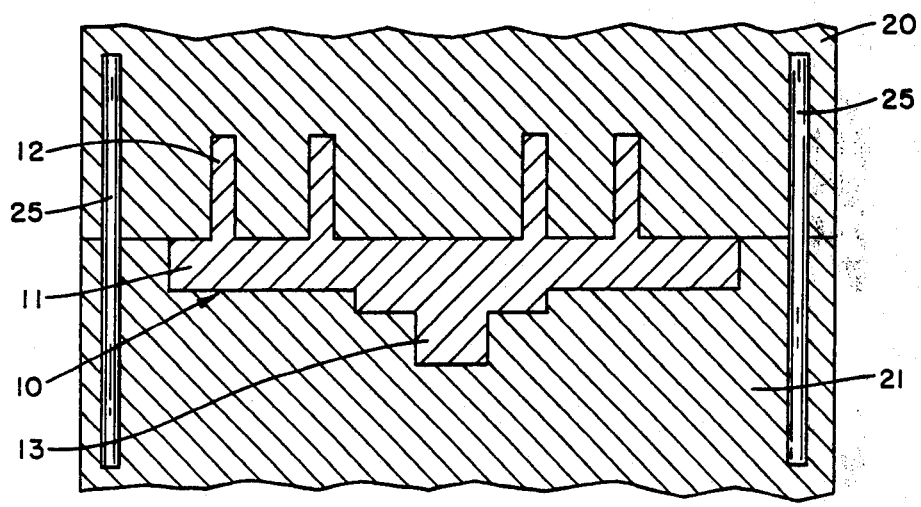
FIG. 5 shows the finished coined scroll member prior to removal from the closed dies.

FIGS. 3-5 illustrate in cross section exemplary complementary female dies constructed in accordance with this invention and their use in forming a scroll member. As will be seen from these drawings there are provided an involute die 20 and an end plate die 21. Involute die 20 has an involute cavity 22, defining the desired involute wrap configuration of the desired pitch and number of turns, which is suitable for forming a wrap with a flat tip surface. End plate die 21 has an end plate cavity 23 which includes a stub shaft cavity 24. Two or more spaced aligning pins 25 are mounted in die 21 and pin bearings 26, precisely aligned with pins 25, are provided in die 20 to ensure precise alignment of dies 20 and 21 when they are forced together as shown in FIG. 5.

The determination of the masses of overall dimensions of dies 20 and 21 is well within the skill of the art, as are the choice of metal from which the dies are formed, the techniques used in forming the die cavities and the finishing (e.g., lapping) of contacting die surfaces 27 and 28. For example, die steel may be used and the cavities formed by machining. In keeping with wellknown practice, the application of the required force used in the coining step is conveniently accomplished in a suitable hydraulic press. Such force is applied axially with relation to the centerline of the scroll member. If a release agent or lubricant is required for the cavity surfaces it may be chosen from suitable commercially available materials.

As previously noted, a preferred technique for attaining efficient radial sealing, i.e., preventing leaking from a higher-pressure fluid pocket (e.g., 16 of FIG. 2) to a lower-pressure pocket (e.g. 17) across of tip of the wrap dividing them, is to use an axial compliance/sealing means such as described in U.S. Pat. Nos. 3,994,636 and 4,199,308 and in U.S. Ser. No. 233,915. Such sealing means require that an involute channel be provided along essentially the entire length of the tip or sealing surface of the wrap 12. This channel may be either two- or three- sided, depending upon the sealing means used. FIGS. 6–9 illustrate, in fragmentary cross sections, the formation of such channels in the coining step of this invention.

In forming a three-sided channel 30 as shown in FIG. 7, the involute wrap 12 of the precision cast scroll member may have a flat tip surface 31 (FIG. 6) in which case channel 30 is formed entirely by upsetting the metal at the free end of wrap 12 and forcing it into the channel-contoured cavity 32 of the involute die 20. This procedure is, of course, only applicable to those wrap metals having sufficient ductility to permit it to be precisely coined into the desired configuration. It is also necessary to provide in the volume of wrap 12 just enough metal to ensure the filling of cavity 32 and the attaining of the desired wrap height. Alternatively, auxiliary cavities can be provided within the dies to accommodate excess metal sequeezed out during the coining operation.

A preferred precision cast wrap configuration, is shown in FIG. 8. Wrap 35 is precision cast to have a channel 36 which is then accurately dimensioned and finished in the coining of the scroll member. FIG. 9 illustrates the formation of a two-sided channel 37 in a precision cast wrap 38 by using an involute die having the required contour of cavity 39.

For some types of scroll apparatus it is highly desirable, if not necessary, to use scroll members, the contacting end plate surfaces of which exhibit a high degree of wear resistance. Since in such instances the flanks or sides of the wraps normally do not have to meet this requirement, it is desirable to have available one or more fabrication methods which permit making scroll members with controlled surface characteristics. One such method comprises the additional steps, after coining in accordance with this invention, of temporary masking the flank surfaces and then treating the end plate surface, for example by hard anodization or by hard chrome plating.

The U.S. Pat. No. 3,994,365, there is disclosed the construction of two-piece scroll members in which the involute wrap, seated in a channel in the end plate surface, is either free to experience small axial and radial excursions in the channel or is rigidly attached to the end plate. In U.S. Pat. No. 3,994,365 rigid attachment is attained through the use of a plurality of spaced screws. Although this method of fabrication makes it possible to form the involute wrap and end plate from two different materials and, if desired, to pretreat the end plate surface, it is necessary to achieve a relatively tight fit of the wrap in the channel as well as the precise alignment of a large number of threaded holes through the end plate with threaded holes in the involute surface. In copending application Ser. No. 239,563, filed concurrently herewith, there is disclosed an improved method of fabricating a scroll member having an involute wrap rigidly affixed to an end plate, comprising the steps of forming in the surface of an end plate an involutely configured channel; forming a reentrant groove in one side wall of the channel along its length; providing an involute wrap sized and configured to seat in the channel and having a surface configured to at least partially engage the reentrant groove along its length, seating the wrap into the channel thereby to define a locking space between the flank of the wrap and the other side wall of the channel; and locking in the wrap into fixed engagement with the groove. The attainment of the required dimensional accuracy and finish of the wrap and end plate thereby depends exclusively on the quality of precision casting achieved. The method of Ser. No. 239,563 does however represent a major improvement in that the assembly of the scroll member is far less labor intensive than disclosed in U.S. Pat. No. 3,994,365 and hence far more suitable for large scale commercial production. However, the need to use a separate locking means, the surface of which makes up a portion, albeit small, of the final end plate surface still requires the temporary masking of the flank surfaces after final assembly if the end plate surface is to be treated.

It is, however, possible to eliminate the need for temporarily masking the flank surfaces by forming the scroll member as a two-piece element in accordance with the method of this invention. This is illustrated in FIGS. 10 and 11. The precision cast end plate 45 has machined into its surface 46 an involute channel 47 of a width less than that of the involute wrap and having opposed reentrant grooves 48 and 49. Surface 46 may then be treated by any suitable technique to provide it with a surface 50 modified to impart any desired characteristic, e.g., high wear resistance, corrosion resistance or the like.

The involute wrap 53 is formed to have an attachment section 54, of a width equal to that of the opening of channel 47, and having a central groove 55 running along its length to provide opposed locking members 56 and 57. Although wrap 53 may be precision cast as an involute having attachment section 54 and sealing channel 36, it is preferable to start with a metal strip of the required dimensions, machine out attachment section 54 and channel 36, and then roll it into the desired involute configuration. Metal volumes and dimensions of the separate involute 53 are chosen such that when the scroll member is coined as described above, the involute wrap 53 will be rigidly affixed to end plate 45 as shown in FIG. 11. In coining, the metal of locking members 56 and 57 is forced to flow into reentrant grooves 48 and 49 to form locks 58 and 59 and to firmly affix involute 53 to end plate 45 which has already received the desired surface treatment.

In my copending application Ser. No. 239,414, I have disclosed the use of a locking means, separate from the involute, for rigidly affixing the involute to an end plate. As shown in FIGS. 12 and 13, such a locking means may also be used and incorporated into the method of this invention. In this embodiment, wrap 62 has a groove 63 cut in it so that the wrap end is configured to fit into reentrant groove 48 and to leave a space between the wrap flank 64 and the wall 65 of the channel. A locking strip 66 is inserted into this space and during coining it is forced down into reentrant groove 49 to form lock 67. Simultaneously, the wrap end is forced into effective contact with the surface of reentrant groove 48. Since it is desirable in an operational scroll apparatus that the radial forces brought about by reason of the pressure differential across the wrap be used to reinforce the locking means of FIGS. 12 and 13, flank 64 should face the center line of the machine (see FIG. 2).

The method and apparatus of this invention make possible the large-scale fabrication of scroll members having the dimensional accuracy and finish characteristics required of these machine elements. The scroll members may be formed as an integral element or they may be fabricated from separate wrap and end plate pieces, the latter embodiment offering the possibility of using different metals for the two pieces and providing different surface characteristics for them.

It will thus be seen that the objects set forth above, among those made apparent from the preceding description are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

I claim:

1. A method of fabricating a scroll member, comprising the steps of:

(a) providing a two-piece scroll member by separately forming an involute wrap and forming an end plate with an involute channel in the surface thereof; and assembling said scroll member by seating said involute wrap in said channel, said assembled two-piece scroll member having attained at least about 95 percent of the dimensional accuracy and finish required for the flank surfaces of said wrap and the contacting surfaces of said end plate; and (b) coining said assembled two-piece scroll member to the required dimensional accuracy and finish.

2. A method in accordance with claim 1 including the step of treating said surface of said end plate prior to assembling said scroll member.

3. A method in accordance with claim 1 wherein said step of separately forming said end plate with said involute channel comprises forming opposing reentrant grooves in said channel; and said forming of said involute wrap comprises configuring said wrap so that it may be coined into at least one of said reentrant grooves to rigidly lock said wrap to said end plate.

4. A method in accordance with claim 3 wherein said wrap is configured to be coined into both of said reentrant grooves.

5. A method in accordance with claim 4 wherein forming said wrap comprises forming on the surface of said wrap an attachment section sized to fit into the opening of said channel and forming on the end of said section a groove thereby to provide opposed locking members for coining into said opposed reentrant grooves.

6. A method in accordance with claim 3 wherein said wrap is configured to be coined into one of said reentrant grooves and to define within said channel a locking space, and said method includes inserting a locking strip into said space to be coined into the other of said reentrant grooves.

7. A method in accordance with claim 1 wherein the tip end of said wrap defines along essentially its entire length a channel arranged to accomodate a tip seal.

8. A method in accordance with claim 1 wherein said step of forming said involute wrap comprises rolling a strip of material into the desired involute configuration.

* * * * *